Nov. 26, 1946.　　　S. RAMO　　　2,411,553
RADIO FREQUENCY POWER MEASUREMENT
Filed Jan. 1, 1943
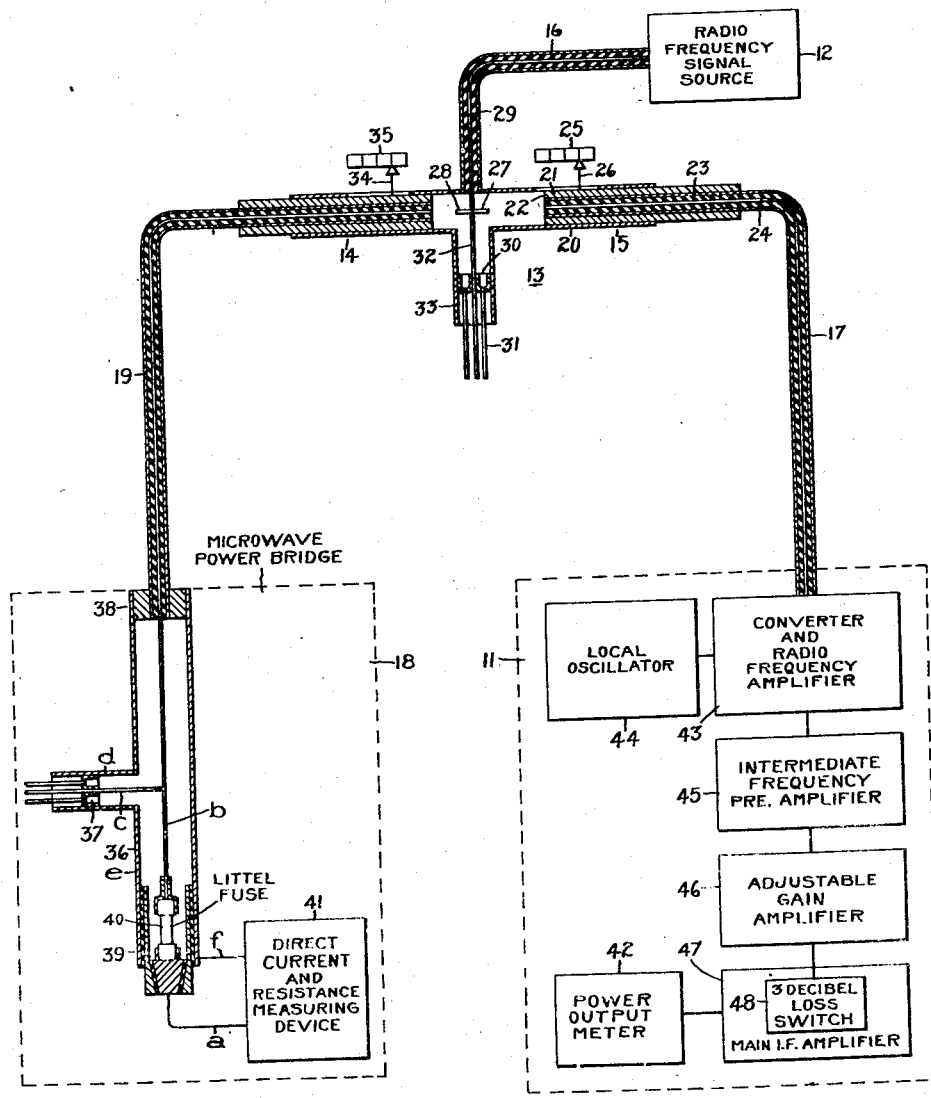
Inventor:
Simon Ramo,
by Harry E. Dunham
His Attorney.

Patented Nov. 26, 1946

2,411,553

UNITED STATES PATENT OFFICE 2,411,553

RADIO-FREQUENCY POWER MEASUREMENT

Simon Ramo, Niskayuna, N. Y., assignor to General Electric Company, a corporation of New York Application January 1, 1943, Serial No. 470,976

2 Claims. (Cl. 171—95)

My invention relates to radio frequency apparatus and concerns particularly arrangements for measurement and comparison of power.

It is an object of my invention to provide arrangements for determination of the magnitude of alternating current power, especially radio frequency power in the microwave region although the power level to be measured is extremely low.

Another object of my invention is to provide arrangements for determination of the noise level in radio apparatus.

Still another object of my invention is to provide arrangements for comparing relatively high level and low level power.

It is also an object of my invention to provide arrangements for measuring low level power with substantially the same accuracy as power may be measured at higher levels.

Other and further objects and advantages will become apparent as the description proceeds.

My invention finds its principal use in the field of microwave measurements, that is, measurements of radio frequency energy where the wave length is of the order of centimeters, since in this region conventional wattmeters cannot be employed and previously known power measuring devices adapted to measurements in this range of frequencies do not give accurate results in case of low levels of power which must frequently be measured.

In carrying out my invention in its preferred form in connection with the measurement of the power input of microwave alternating current energy, I provide a radio frequency signal source, a pair of adjustable attenuators to which the radio frequency signal source is coupled and output connections from the attenuators, one of which leads to a device the power characteristics of which are to be measured at low level and the other of which leads to a power measuring device which operates on microwaves but which is designed primarily for relatively high power measurements in order to obtain the desired accuracy. The attenuators are so adjusted that the power input to the device to be measured or tested is much more greatly attenuated than the power input to the high level power measuring device. The attenuators are made as nearly as possible identical in construction and arrangement so that the ratio of attenuation may be read from the settings of the attenuators although the actual attenuation may be unknown.

A better understanding of the invention will be afforded by the following description considered in connection with the accompanying drawing, and those features of the invention which are believed to be novel and patentable will be pointed out in the claims appended hereto.

The single figure of the drawing is a schematic diagram of one embodiment of my invention.

For the sake of illustration the invention will be described as used for the determination of the power input at a low level to a device such as a radio receiver 11, for example, or an element of a radio receiver represented by one of the rectangles in the larger rectangle 11. The manner of measuring the noise level in such a receiver or receiver component will also be explained.

For the purpose of making determinations a source of energy input of the desired frequency is provided. This is represented by the box 12 captioned. A comparator attenuator 13 is provided which is in the form of a pair of identical attenuators 14 and 15 arranged to have power from the RF signal source 12 supplied thereto through suitable connections such as a coaxial line 16. The attenuators 14 and 15 are so constructed that the ratio of attenuation may be very accurately known, although the absolute value of attenuation need not be determined. Likewise it is unnecessary to be able to determine the value of the power output of the RF signal source.

One of the attenuators: viz., the attenuator 15, has output connections in the form of a coaxial line 17, for example, to the device 11, the power input to which is to be determined, or the noise level of which is to be determined.

A suitable power measuring device 18 is provided which need not be capable of functioning or measuring accurately, except at a relatively high level of power, in comparison with that supplied to the device 11. For the sake of convenience, therefore, I shall refer to the device 18 in the description and claims as a high level power measuring device. It will be understood that by this expression I mean a power measuring device which may operate at a high level in comparison with the level of the power or the noise which is to be measured or determined. The output of the attenuator 14 is supplied to the high level power measuring device 18 through suitable connections such as a coaxial line 19. The attenuators 14 and 15 are shown as being of the wave guide type in the form of hollow pipes which may be circular or rectangular, but for the sake of illustration, will be assumed to be circular. The attenuators 14 and 15 are referred to as being of the wave guide type because no central conductor is provided but the dimensions are such that they do not actually serve as wave guides but as attenuators instead, the transverse dimensions being so chosen that the cutoff wave length is less than the wave length of the energy supplied by the RF signal source 12. Under such conditions of operation the degree of attenuation is very high, the energy being attenuated to as little as one-millionth of the input energy if desired.

Since the attenuators 14 and 15 are identical, it will be sufficient to describe one of them in detail. The attenuator 15, for example, comprises a tube or pipe 20 of considerable length in comparison with its radius and having a radius such that the cutoff frequency of the pipe 20 considered as a wave guide is less than the wave length of the source 12. For adjustment of the attenuation of the attenuator 13 a telescoping internal unit 21 is provided which is adapted to slide axially within the tube 20 and has a flat annular end member 22 serving as an electrical termination for the pipe 20. The coaxial line 17 is extended into the member 21 so as to form a cylinder 23 and an inner conductor 24 mounted within the slidable member 21 so as to move with it when the member 21 is slid to the right or the left for adjustment of attenuation. An attenuation scale 25 is provided and there is a pointer 26 cooperating with the scale 25. The pointer 26 is mechanically connected to the member 21 so that it moves back and forth therewith and the position of the pointer 26 with respect to the scale 25 serves as an indication of the position of the electrical end point 22 of the attenuator pipe 20. The end of the internal conductor 24 may be extended to form a probe if desired, but this is not necessary since the source 12 ordinarily has sufficient power so that the power pickup of the concentric line elements 23 and 24 will be adequate.

For transferring power from the coaxial line 16 to the attenuators 14 and 15, a pair of probes 27 and 28 may be provided which are electrically connected to the internal conductor 29 of the coaxial line 16. The dimensions of the probes 27 and 28 are not critical, but if it is desired to make use of a signal source 12 of the minimum necessary power output, the probes 27 and 28 may be made one-fourth of a wave length. Furthermore, if it is desired to conserve power output, a conventional matching stub 30 may be provided having a movable end member 31 making electrical contact both with the continuation of the coaxial line internal conductor 29 and the external conductor 33.

The attenuator 14, as explained, is as far as possible identical with the attenuator 15 and has corresponding elements including a pointer 34 cooperating with a scale 35.

The high level power measuring arrangement 18 may take the form of any suitable device for measurement of power in the microwave region such as a calibrated crystal, for example, connected to a deflecting instrument or may take the form of a bridge device of the type known as a microwave power bridge. Such microwave power bridges do not constitute my invention. They consist briefly of a section of a concentric line 36 with a tuning stub 37 and very accurately and carefully made end constructions 38 and 39, such that for practical purposes all of the power input received from the coaxial line 19 is transmitted to a resistor 40 at the end 39 of the element 36. The resistor 40 may take the form of a Littel fuse, for example. A suitable device, represented by the box 41, is provided for both supplying a direct current to the resistor 40 and for measuring the resistance of the resistor 40. The direct current circuit comprises the device 41, the conductor $a$, the resistor 40, the internal conductors $b$ and $c$, the stub cylinder $d$, the cylinder $e$, and the return conductor $f$. Inasmuch as the current flow through the resistor produces variations in its temperature and resistance, a measurement of the resistance of a resistor serves as a measurement of the power input thereto. The high frequency power input to the resistor 40 may therefore be determined by comparing the resistance variations produced by the alternating current input power with the resistance variations produced by direct current input. Ordinarily a null arrangement, such as a Wheatstone bridge or the arrangement described in Patent No. 1,501,663, Hoxie, is employed. If desired, the microwave power bridge may be adjusted for a predetermined power measurement, deviations from which will be indicated by deviation from a null indication in the device 41. The fuse 40 and its holder are made axially adjustable in tube 39.

When it is desired to make a measurement of the power input to the device 11 or of the power required to produce a predetermined effect in the device 11, the apparatus is connected as shown and the attenuator 14 is so adjusted that balance is obtained in the device 41 or a satisfactory measurement of power is obtained in the microwave power bridge 18. The power input to the device 18 is then known. The power input to the device 11 is determined by comparing the attenuations of the attenuators 14 and 15. Such attenuators have a constant attenuation per unit length. Consequently the ratio of attenuation or the difference in attenuation measured in decibels may be determined by obtaining the difference in the readings on the scales 25 and 35. If these scales are uniformly graduated, the difference in reading will be directly proportional to the decibel difference in attenuation. It will be understood that the attenuation measured in decibels is numerically equal to ten times the logarithm of the ratio between the input power and the output power.

The attenuation of elements such as the attenuators 14 and 15 may be calculated from the physical constants by methods known to those skilled in the art, and the end effects will be negligible. However, calculated values may be checked by taking readings at several different settings of the attenuators with different power readings of the microwave power bridge 18 and comparing the readings of the microwave power bridge 18 at the different attenuator settings.

In the case of circular pipes forming the attenuators 14 and 15 the absolute value of attenuation may be obtained from the following formula:

$$\alpha = \frac{2\pi}{\lambda}\sqrt{1-\left(\frac{\lambda c}{\lambda}\right)^2} \text{ nepers/meter}$$

or $$\alpha = \frac{8.686 \times 2\pi}{\lambda}\sqrt{1-\left(\frac{\lambda c}{\lambda}\right)^2} \text{ decibels/meter}$$

$$= \frac{54.6}{\lambda}\sqrt{1-\left(\frac{\lambda c}{\lambda}\right)^2} \text{ decibels/meter}$$

where $\alpha$ is attenuation per unit length
$\lambda$ = wave length in meters
$\lambda c$ = cutoff wave length
$\lambda c = 1.640 a$
$a$ = pipe radius in meters The methods and the apparatus hereinbefore described may be used for making various types of measurements involving determination of power. For example, if it is desired to determine the noise level of a radio receiver 11 having a power output meter 42 or connections to which a suitable measuring device such as a cathode ray oscilloscope may be connected for measuring power output, the noise level may be determined in the following manner. With no input signal, the reading of the device 42 is taken. An input signal is then applied, and the attenuator 15 is adjusted to give double the former reading on the power output meter 42, the attenuator 14 being simultaneously adjusted to obtain a satisfactory reading on the microwave power bridge 18. The power input through the coaxial line 17 is obviously equal to the noise level of the device 11. This power input is calculated from the absolute value of power input measured by the microwave power bridge 18 and the ratio of attenuations measured in decibels and determined by the difference between the readings of the scales 25 and 35.

In case the device in which noise level is to be determined consists of a converter, or a converter and radio frequency amplifier 43, the unit 43 will be combined with certain other units in a conventional manner so that a power output reading may be obtained in the device 42. In the case assumed a local oscillator 44 is provided, and other elements such as an intermediate frequency pre-amplifier 45, an adjustable gain amplifier 46 and a main intermediate-frequency amplifier 47 may be interposed between the converter 43 and the power output meter 42. In this case a three-decibel loss switch 48 may be interposed between the units 46 and 47 or may be incorporated in the unit 47. Then the device 42 may be a null device which gives a null or zero reading for a predetermined power output from the main IF amplifier 47.

With the loss switch 48 disconnected and no input signal source applied to the line 17, the adjustable gain amplifier 46 is adjusted to obtain a null reading in the meter 42. Then the signal source is applied through the coaxial line 17, the loss switch 48 is thrown to the position in which it introduces a loss of three decibels, that is, a power reduction of one-half and the attenuator 15 is adjusted so that the meter 42 again reads zero. The attenuator 14 is simultaneously adjusted to obtain a satisfactory reading in the microwave power bridge 18. The power input through the coaxial line 17 determined from the reading of the device 18 and the attenuation ratios of the attenuators 14 and 15 then equals the value of the noise level of the converter 43.

It will be understood that for noise level measurement, particularly, the adjustment of the attenuators 14 and 15 is such that attenuation of the unit 15 is much greater than that of the unit 14, thus permitting the measurement of very low noise levels although the device 18 may read satisfactorily only when very much higher levels of power are applied to it.

I have herein shown and particularly described certain embodiments of my invention and certain methods of operation embraced therein for the purpose of explaining its practice and showing its application, but it will be obvious to those skilled in the art that many modifications and variations are possible, and I aim therefore to cover all such modifications and variations as fall within the scope of my invention which are defined in the appended claims.

What I claim as new and desire to secure by Letters Patent of the United States is:

1. Apparatus for measuring low level power which comprises a pair of attenuators of like construction such that the ratio of attenuation is determined by the differences in adjustment although the absolute attenuations in each may be unknown, means for simultaneously supplying power to both of said attenuators, means for conveying power output from one attenuator to a device in which low level power is to be measured, a high level power measuring device, and means for conveying power output from the other attenuator to said high level power measuring device.

2. Microwave low level power measuring apparatus comprising a pair of wave guide type attenuation pipes with means for supplying microwave energy thereto, said pipes having such transverse dimensions that the cutoff wave length is less than the wave length at which the power measurement is to be made, said attenuators having movable elements for varying the effective electrical lengths thereof to vary the attenuations and for determining the ratio of attenuation, a relatively high level power measuring device, means for conveying power output from one of said attenuators to a device in which low level power is to be measured, and means for conveying power output from the other of said attenuators to a relatively high level power measuring device.

SIMON RAMO.